United States Patent
Reis et al.

(10) Patent No.: US 9,873,208 B2
(45) Date of Patent: Jan. 23, 2018

(54) WAVY SHAPED POTATO STICKS

(71) Applicant: Ballreich Bros., Inc., Tiffin, OH (US)

(72) Inventors: Brian K. Reis, Tiffin, OH (US); Robert W. Reis, II, Tiffin, OH (US)

(73) Assignee: Ballreich Bros., Inc., Tiffin, OH (US)

( * ) Notice: Subject to any disclaimer, the term of this patent is extended or adjusted under 35 U.S.C. 154(b) by 0 days.

(21) Appl. No.: 15/361,822

(22) Filed: Nov. 28, 2016

(65) Prior Publication Data

US 2017/0072579 A1 Mar. 16, 2017

Related U.S. Application Data (63) Continuation-in-part of application No. 14/209,014, filed on Mar. 13, 2014, now Pat. No. 9,592,618.

(60) Provisional application No. 61/779,129, filed on Mar. 13, 2013.

(51) Int. Cl.

| | |
|---|---|
| *B26D 3/26* | (2006.01) |
| *A23P 30/00* | (2016.01) |
| *B26D 3/10* | (2006.01) |
| *A23L 19/18* | (2016.01) |
| *B26D 1/03* | (2006.01) |
| *B26D 3/28* | (2006.01) |
| *B26D 7/06* | (2006.01) |
| *B26D 1/00* | (2006.01) |

(52) U.S. Cl.
CPC .............. *B26D 3/26* (2013.01); *A23L 19/18* (2016.08); *A23P 30/00* (2016.08); *B26D 1/03* (2013.01); *B26D 3/10* (2013.01); *B26D 3/28* (2013.01); *B26D 7/0691* (2013.01); *B26D 2001/006* (2013.01); *B26D 2210/02* (2013.01); *Y10S 83/932* (2013.01); *Y10T 83/0586* (2015.04); *Y10T 83/9324* (2015.04)

(58) Field of Classification Search
CPC ........ B26D 1/03; B26D 1/143; B26D 1/1435; B26D 1/147; B26D 1/1475; B26D 1/15; B26D 1/151; B26D 1/45; B26D 3/24; B26D 3/26; B26D 3/10; B26D 3/28; B26D 7/0691; B26D 11/00; B26D 2011/005; B26D 2010/00; B26D 2010/02; B26D 2210/02; B26D 2001/006; Y10S 83/932; Y10T 83/6473; Y10T 83/9488; Y10T 83/929; Y10T 83/9372; Y10T 83/9457; Y10T 83/0586; Y10T 83/9324; A23L 19/18; A23P 30/00

See application file for complete search history.

(56) References Cited

U.S. PATENT DOCUMENTS

| | | |
|---|---|---|
| 2,464,898 A | 12/1945 | Socier |
| 2,291,449 A | 3/1949 | Burgess et al. |
| 2,664,130 A | 12/1953 | Kubon |
| 2,836,212 A | 5/1958 | Shaw |
| 2,991,814 A | 7/1961 | Popeil |

(Continued)

*Primary Examiner* — Phong Nguyen
(74) *Attorney, Agent, or Firm* — Ward Law Office LLC; Jacob M. Ward (57) ABSTRACT

A grate for use in forming potato stick products having a wavy cross-sectional shape is provided. The grate includes a plurality of alternating convex segments and concave segments extending in a repeating pattern along a length of the grate. A plurality of spaced apart teeth extends from the plurality of convex segments and the plurality of concave segments. A distance between the spaced apart teeth defines a width of the potato stick products.

14 Claims, 9 Drawing Sheets

(56) References Cited

U.S. PATENT DOCUMENTS

| | | |
|---|---|---|
| 3,139,128 A | 6/1964 | Urschel et al. |
| 3,211,202 A | 10/1965 | Mason |
| 3,217,768 A | 11/1965 | Lamb |
| 3,361,173 A | 1/1968 | Lamb |
| 3,391,005 A | 7/1968 | Babigan |
| 3,395,742 A | 8/1968 | Sanders |
| 3,401,728 A | 9/1968 | Allen et al. |
| 3,502,126 A | 3/1970 | Howard |
| 3,643,721 A | 2/1972 | Haubner |
| 4,175,690 A | 11/1979 | Bova et al. |
| 4,511,586 A | 4/1985 | Fitzwater et al. |
| 4,523,503 A | 6/1985 | Julian et al. |
| 4,590,835 A * | 5/1986 | Matsuo ............. B26D 1/03 83/403 |
| 6,116,130 A | 9/2000 | Cogan |
| 6,536,691 B2 | 3/2003 | Prewitt et al. |
| 6,968,765 B2 | 11/2005 | King |
| 7,096,771 B2 | 8/2006 | Mendenhall |
| 7,811,615 B2 | 10/2010 | Fein et al. |
| 2010/0236372 A1 | 9/2010 | Desailly et al. |

\* cited by examiner

WAVY SHAPED POTATO STICKS

CROSS REFERENCE TO RELATED APPLICATIONS

This application is a continuation-in-part of U.S. patent application Ser. No. 14/209,014, filed Mar. 13, 2014, which in turn claims the benefit of pending U.S. Provisional Application No. 61/779,129, filed Mar. 13, 2013, the entire disclosure of which is hereby incorporated herein by reference.

BACKGROUND

Potato chips are a common snack product. Potato chips can have flat surfaces that can be formed by urging a potato through flat blades arranged in a parallel orientation, thereby forming a flat slice of the potato. The potato slice can be fried until it is crunchy, thereby providing the potato chip for consumption. Snack manufacturers provide potato chips in a variety of styles, and in a multitude of flavors.

Other potato chips can have wavy (also called "marcelled") shapes. Marcelled style potato chips have a repeating series of peaks and troughs. Marcelled style potato chips can be manufactured using potato slicing machines fitted with a plurality of blades having cooperating wavy cutting edges.

Another snack product, related to potato chips, is known as a potato stick. Potato sticks are generally narrow, sticklike, thin strips of a potato. Typically, potato sticks measure less than 0.5 inches in width and approximately 2.0 inches to 5.0 inches in length. Potato sticks are manufactured in a manner similar to that of potato chips. Potatoes are urged through flat blades arranged in a parallel orientation, thereby forming a flat slice of potato. The resulting flat slice of potato is subsequently urged though grates, thereby cutting the flat slice of potato into sticklike strips.

Conventional flat potato sticks are undesirably fragile, and can break easily during storage and transport. Flat potato sticks are also not well suited for receive dips. With a thicker dip, in particular, flat potato sticks are known to break off and leave behind broken portions in the dip container.

There is a continuing need for a potato stick product having a shape that is more robust for storage and transport. Desirably, the potato stick product is configured to receive dips, and particularly thicker dips, without significant breakage.

SUMMARY

In concordance with the instant disclosure, a potato stick product having a shape that is more robust for storage and transport, and which is configured to receive dips, and particularly thicker dips, without significant breakage, is surprisingly discovered.

In one embodiment, there is provided a grate for use in forming potato stick products having a wavy cross-sectional shape. The grate includes a plurality of alternating convex segments and concave segments extending in a repeating pattern along a length of the grate. A plurality of spaced apart teeth extends from the plurality of convex segments and the plurality of concave segments. A distance between the spaced apart teeth defines a width of the potato stick products.

In another embodiment, there is provided a cutting head assembly for use in forming potato stick products having a wavy cross-sectional shape. The cutting head assembly includes a blade holder having a plurality of alternating convex segments and concave segments. A blade is nested with the blade holder. The blade has a plurality of alternating convex segments and concave segments with a cutting edge configured to extend beyond the convex segments and concave segments of the blade holder. The cutting edge of the blade is further configured to form the wavy cross-sectional shape of the potato sticks. A grate is nested with the blade. The grate has a plurality of alternating convex segments and concave segments configured to align with the plurality of alternating convex segments and concave segments of the blade. The grate has a plurality of spaced apart teeth. A distance between the spaced apart teeth defines a width of the potato stick products. A clamp is configured to secure the blade and the grate to the blade holder.

In a further embodiment, there is also provided a method of forming potato stick products having a wavy cross-sectional shape. The method includes the steps of providing a blade having a plurality of convex segments and concave segments, each having cutting edges, nesting a grate with the blade, the grate having a plurality of convex segments and concave segments, in the nested position the plurality of convex segments and concave segments of the blade substantially align with the convex and concave segments of the grate, the grate including a plurality of spaced apart teeth, a distance between the spaced apart teeth defines a width of the potato sticks and urging one or more potatoes through the nested blade, grate and teeth such that the wavy potato sticks are formed.

BRIEF DESCRIPTION OF THE DRAWINGS

The above, as well as other objects and advantages of the disclosure, will become readily apparent to those skilled in the art from reading the following detailed description, particularly when considered in the light of the accompanying drawings in which.

DETAILED DESCRIPTION

The present disclosure will now be described with occasional reference to the specific embodiments. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

Unless otherwise defined, all technical and scientific terms used herein have the same meaning as commonly understood by one of ordinary skill in the art to which this disclosure belongs. The terminology used in the description herein is for describing particular embodiments only and is not intended to be limiting. As used in the description and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present disclosure. Notwithstanding that the numerical ranges and parameters setting forth the broad scope of the disclosure are approximations, the numerical values set forth in the specific examples are reported as precisely as possible. Any numerical values, however, inherently contain certain errors necessarily resulting from error found in their respective measurements.

In accordance with embodiments of the instant disclosure, apparatus methods for forming potato stick products having a novel wavy shape are provided. Generally, the apparatus and methods include a blade mated with a grate, with the blade configured to impart a wavy pattern to the thin slices of potato. The grate includes a plurality of teeth configured to cut the thin slices of potato into strips, with each strip having the novel wavy pattern. It will be understood the term "potato stick products", as used herein, is defined to mean any product formed from potato and having a generally thin stick form. The term "wavy" as used herein, is defined to mean any shape having one or more peaks and troughs.

Figure 1:
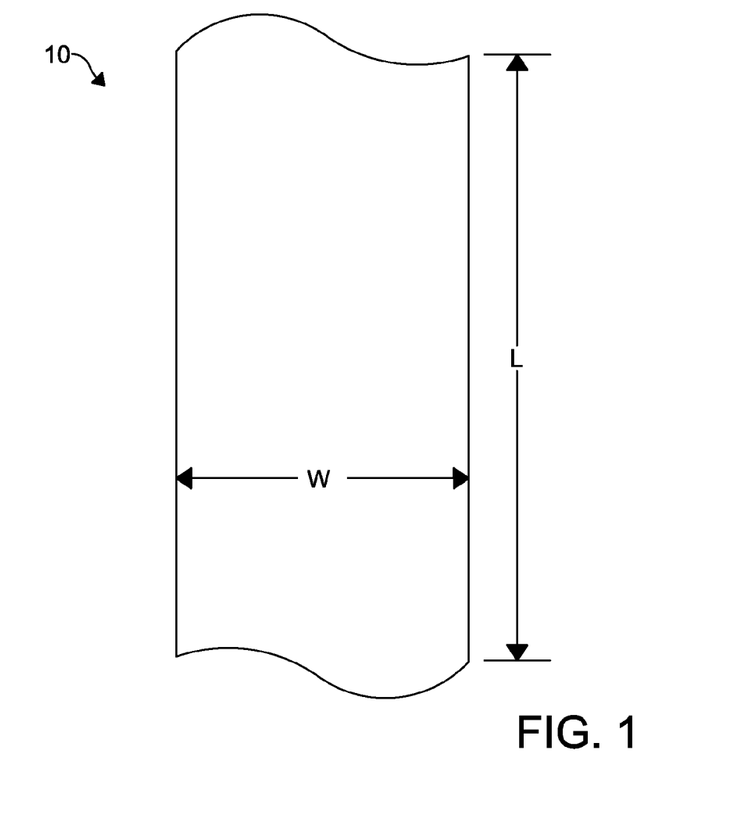
FIG. 1 is a top plan view of a wavy potato stick product according to one embodiment of the present disclosure.
Figure 2:
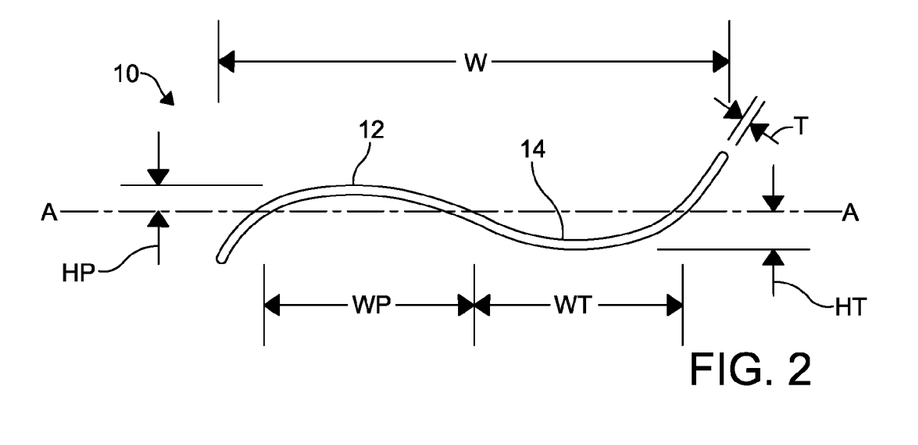
FIG. 2 is an end view, in elevation, of the wavy potato stick product shown in FIG. 1.

Referring now to FIGS. 1 and 2, there is illustrated generally a portion of a potato stick product (hereafter "product") at 10. Referring first to FIG. 1, the product has a width W and a length L. In the illustrated embodiment, the width W is in a range of about 0.2 inches to about 0.4 inches and the length L is in a range of from about 1.0 inch to about 6.0 inches. However, it should be appreciated that in other embodiments, the width W can be less than about 0.2 inches or more than about 0.4 inches, and the length L can be less than about 1.0 inch or more than about 6.0 inches. In still other embodiments, the width W can be expressed as a function of the length L. In these embodiments, width W can be in a range of about 6% to about 15% of the length L. However, it should be appreciated that the width W can be less than 6% of the length L or more than 15% of the length L, as desired.

With reference to FIG. 2, an end view of the product 10 is illustrated. The product 10 has a wavy cross-sectional shape that includes a peak 12 and a trough 14. The peak 12 and the trough 14 cooperate to form an "S" cross-sectional shape along an axis A-A extending the width W of the product 10. While the illustrated embodiment shows the product 10 as having an "S" cross-sectional shape, in other embodiments the product 10 can have other cross-sectional shapes, such as the non-limiting example of a "W" cross-sectional shape. Further, while the illustrated embodiment shows the product 10 as having a single peak 12 and a single trough 14, it should be appreciated that in other embodiments, the product 10 can have more than one peak and more than one trough.

Referring again to FIG. 2, the product 10 has a thickness T. In the illustrated embodiment, the thickness T is in a range of from about 0.04 inches to about 0.10 inches. Alternatively, the thickness T of the product 10 can be less than about 0.04 inches or more than about 0.10 inches. In the illustrated embodiment, the thickness T of the product 10 is substantially constant along the width W. In other embodiments, the thickness T can vary as desired along the width W.

As shown in FIG. 2, the peaks 12 have a height HP as measured from the axis A-A and the troughs 14 have a height HT as measured from the axis A-A. The peaks 12 have a width WP and the troughs 14 have a second width WT. The heights HP, HT and the widths WP, WT will be discussed in more detail below.

The product 10 shown in FIGS. 1 and 2 is provided in a raw (precooked) shape and form. However, it should be understood that the product 10 will have a substantially similar shape and form after the product 10 is fully cooked, for example, through a frying process or a baking process as is known in the art.

Figure 3:
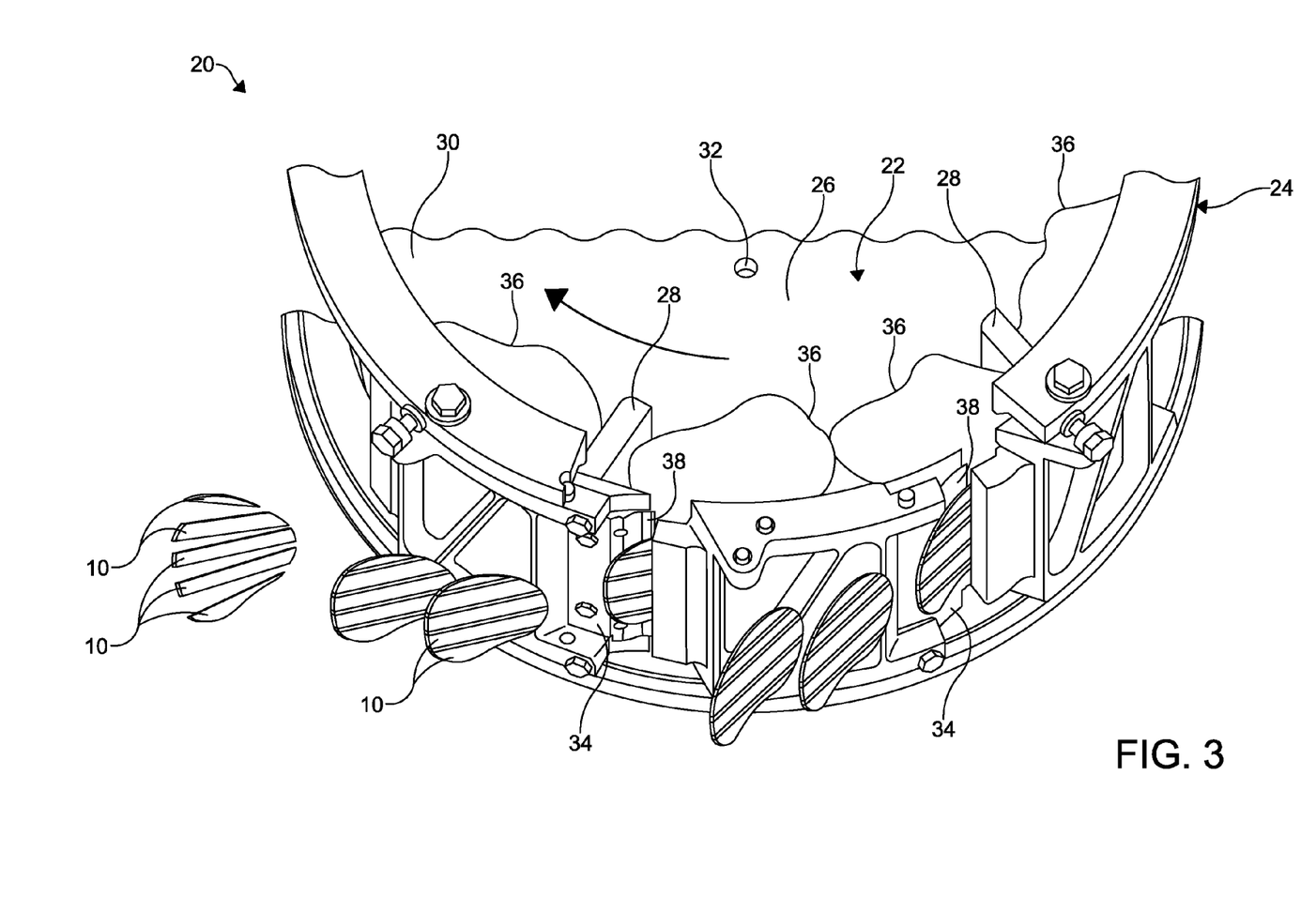
FIG. 3 is a perspective view of a potato slicing machine having a plurality of cutting head assemblies for producing the wavy potato stick product shown in FIG. 1.

Referring now to FIG. 3, an apparatus 20 configured to form potato strips is illustrated generally at 20. The apparatus 20 includes a rotatable impeller 22 positioned within a stationary framework 24. The impeller 22 includes a base 26. A plurality of forms 28 are spaced apart along an outer edge 30 of the base 26. The forms 28 are attached to the base 26, such that the base 26 and the forms 28 rotate together about base center point 32.

The framework 24 shown in FIG. 3 includes a plurality of spaced apart cutting head assemblies 34. As will be discussed in more detail below, each cutting head assembly 34 includes a blade and grate assembly 38, configured to slice potatoes 36, thereby forming the product 10.

In operation, raw potatoes 36 are loaded into the apparatus 20 as the impeller 22 is rotated. Centrifugal force urges the potatoes 36 to the outer edge 30 of the base 26, where the potatoes contact the forms 28. The potatoes 36 are repeatedly guided by the forms 28 into contact with the blade and grate assemblies 38. The blade and grate assemblies 38 simultaneously cut the potatoes 36 into thin slices and cut the thin slices into narrow strips, thereby forming the desired potato stick product 10. The cutting head assemblies 34 can be adjusted to vary the thickness T of the product 10 as desired.

Figure 4A:
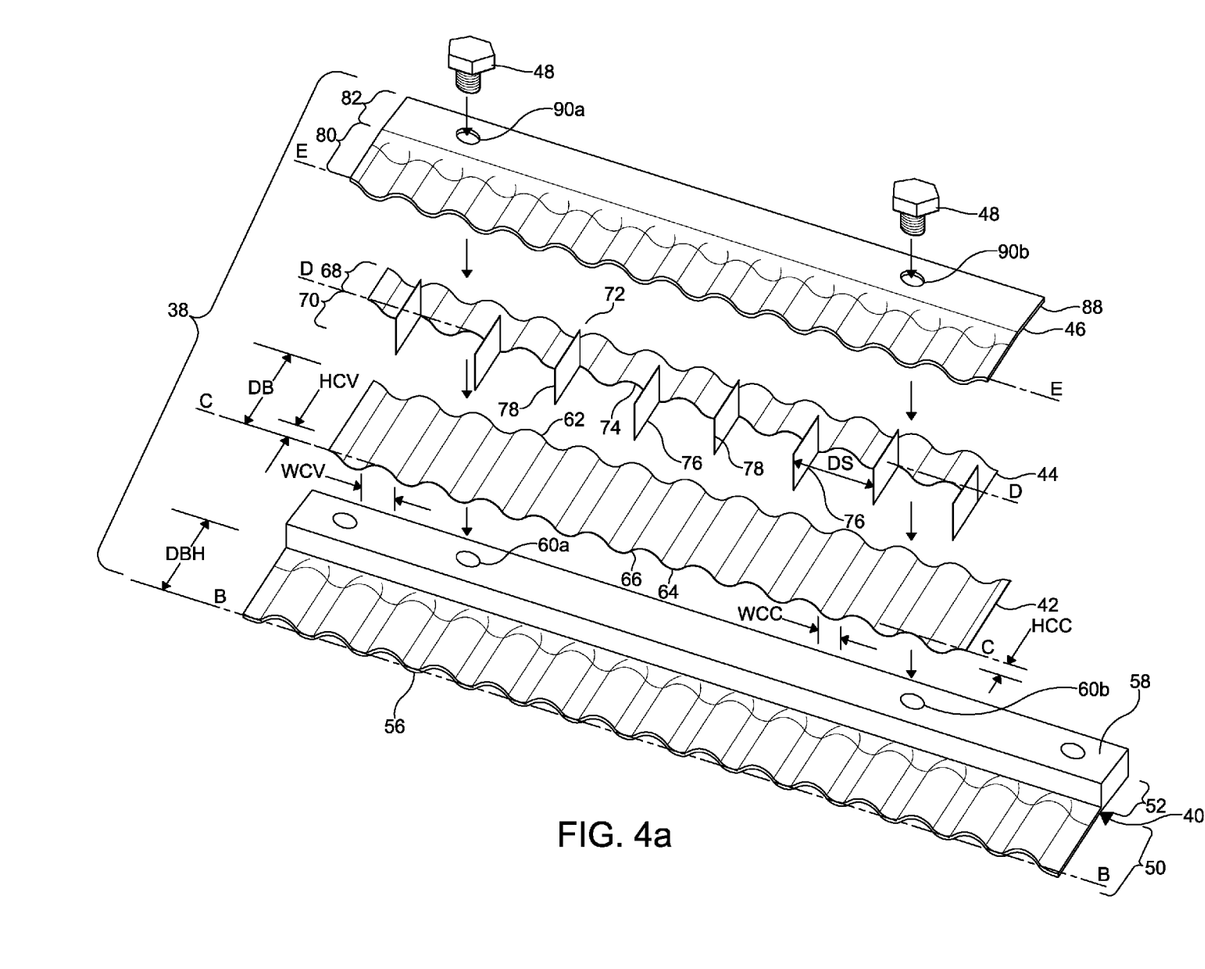
FIG. 4*a* is an exploded perspective view of a blade and grate assembly of the potato slicing machine of FIG. 3, and illustrating a blade and a grate having a plurality of teeth.

Referring now to FIG. 4a, an exploded view of a blade and grate assembly 38 is illustrated. The blade and grate assembly 38 includes a blade holder 40, a blade 42, a grate 44, a clamp 46 and a plurality of fasteners 48. The blade holder 40 has a first segment 50 and a second segment 52. The first segment 50 has a plurality of alternating convex segments 54 and concave segments 56 disposed transversely along an axis B-B extending a length of the blade holder 40. As will be explained in more detail below, the pattern of alternating convex segments 54 and concave segments 56 of the first segment 50 of the blade holder 40 is configured to correspond to a similar pattern of convex segments and concave segments forming the blade 42.

The first segment 50 of the blade holder 40 has a depth DBH. The depth DBH will be discussed in more detail below.

Referring again to FIG. 4a, the second segment 52 of the blade holder 40 is attached to the first segment 50 and forms an upper surface 58. The second segment 52 further includes apertures 60a, 60b. As will be explained in more detail below, the upper surface 58 and the apertures 60a, 60b are used to secure the blade 42, grate 44 and clamp 46 to the blade holder 40.

With reference to FIG. 4a, the blade 42 includes a plurality of repeating convex segments 62 and concave segments 64 disposed transversely along a transverse axis C-C of the blade 42, thereby forming a marcelled cross-sectional shape. As discussed above, the repeating convex segments 62 and concave segments 64 of the blade 42 are configured to generally correspond to, and align with, the repeating convex segments 54 and concave segments 56 of the blade holder, such that the blade 42 can nest tightly against the first segment 50 of the blade holder 40. In the tightly nested position, there is no appreciable space between the blade 42 and the blade holder 40. Any desired quantity of convex segments 62 and concave segments 64 can be disposed along a length of the blade 42. While the embodiment illustrated in FIG. 4a includes convex segments 62 and concave segments 64 configured to form the marcelled cross-sectional shape, it is contemplated that the blade 42 can have other cross-sectional shapes.

As shown in FIG. 4a, the convex segments 62 of the blade 42 have a height HCV, as measured from the axis C-C, and the concave segments 64 have a height HCC, as measured from the axis C-C. The height HCV of the convex segments 62 is configured to form the height HP of the peaks 12 of the product 10, and the height HCC of the concave segments 64 is configured to form the height HT of the troughs 14 of the product 10 as shown in FIG. 2. In the illustrated embodiment, the heights HCV, HCC are equal. However, a skilled artisan may select different heights HCV, HCC, as desired.

Referring again to FIG. 4a, the convex segments 62 have a width WCV and the concave segments 64 have a width WCC. The width WCV of the convex segments 62 is configured to form the width WP of the peaks 12 of the product 10, and the width WCC of the concave segments 64 is configured to form the widths WT of the troughs 14 of the product 10 as shown in FIG. 2. In the illustrated embodiment, the widths WCV, WCC are equal. However, in other embodiments, the widths WCV, WCC may be different.

The blade 42 has an edge 66 configured to slice potatoes. In the illustrated embodiment, the edge 66 is configured as a double edged razor. Alternatively, the edge 66 can have other configurations, such as for example, a single edge, sufficient to slice potatoes.

Referring again to FIG. 4a, the blade 42 has a depth DB. In the illustrated embodiment, the depth DB of the blade is longer than the depth DBH of the first segment 50 of the blade holder 40, such that in a nested position, the edge 66 of the blade 42 extends beyond the first segment 50 of the blade holder 40. However, it is contemplated that the blade 42 can have any desired depth DB, sufficient that in a nested position, the edge 66 of the blade 42 extends beyond the first segment 50 of the blade holder 40.

In the embodiment illustrated in FIG. 4a, the blade 42 is formed from a metallic material, such as for example, carbon steel. However, in other embodiments, the blade 42 can be formed from other materials, such as for example, rigid polymeric materials, sufficient to slice potatoes. Further, the blade 42 can have any desired surface coating such as, for example, a low-friction coating, or any desired surface texture such as the non-limiting example of a micro-grooved surface texture.

Referring again to FIG. 4a, the grate 44 includes a first segment 68 and a second segment 70. The first segment 68 includes a plurality of alternating convex segments 72 and concave segments 74 disposed transversely along a transverse axis D-D of the grate 44. In the illustrated embodiment, the convex segments 72 and concave segments 74 of the grate 44 have similar heights and widths of the convex segments 62 and concave segments 64 of the blade 42, thereby allowing the first segment 68 of the grate 44 to align and nest with the blade 42. In other embodiments, the convex segments 72 and concave segments 74 of the grate 44 can have other shapes, dimensions and characteristics sufficient to allow the first segment 68 of the grate 44 to nest with the blade 42.

With renewed reference to FIG. 4a, the second segment 70 of the grate 44 includes a plurality of spaced apart teeth 76 extending from the convex segments 72 and the concave segments 74. In the illustrated embodiment, the teeth 76 are aligned in planes that are substantially perpendicular to the transverse axis D-D. However, in other embodiments, the teeth 76 can have other desired alignments relative to the transverse axis D-D.

The teeth 76 have an edge 78 configured to slice potatoes. In the illustrated embodiment, the edge 78 is configured as a double edged razor. Alternatively, the edge 78 can have other configurations, such as for example, a single edge, sufficient to slice potatoes.

Referring again to embodiment illustrated in FIG. 4a, the edge 78 is aligned to be substantially perpendicular to the transverse axis D-D. However, in other embodiments, the edge 78 can be aligned in other orientations relative to the transverse axis D-D.

Referring again to FIG. 4a, and as discussed above, the teeth 76 are spaced apart along the length of the gate 44 an equal distance DS from each other. In the illustrated embodiment, the distance DS is substantially the same as the width W of the product 10 as shown in FIG. 1. It is contemplated that the distance DS between teeth 60 may vary as desired.

Referring again to the embodiment shown in FIG. 4a, the teeth 76 have a substantially rectangular shape. Alternatively, the teeth 76 can have any desired shape, including the non-limiting shape of a triangle, sufficient that an edge 78 of the teeth is configured for forming the product 10.

Referring again to FIG. 4a, the teeth 76 are disposed along the length of the grate 44 such that the resulting product 10 comprises at least one peak 12 and at least one trough 14. Positioning of the teeth 76 in these locations allows the grate 44 to slice the potatoes such as to form the shape of the product 10 shown in FIGS. 1 and 2. It should be understood that the teeth 76 can be disposed in a substantially identical manner along the length of the grate 44, such that each of the teeth 76 can be disposed at the vertex of each convex segment 72 or in another manner. Additionally, it should be understood that the teeth 76 can also be spaced apart at varying distances.

In the embodiment illustrated in FIG. 4a, the grate 44 and the teeth 76 are formed as a unitary structure. However, it is within the contemplation of this disclosure that the teeth 76 can be formed as discrete members and later added to the grate 44.

Referring again to the embodiment illustrated in FIG. 4a, the grate 44 is formed from a metallic material, such as for example, carbon steel. However, in other embodiments, the grate 44 can be formed from other materials, such as for example, polymeric materials, sufficient to slice potatoes. Further, the grate 44 can have any desired surface coating, such as for example, a low-friction coating or any desired surface texture, such as the non-limiting example of a micro-grooved surface texture.

Referring again to FIG. 4a, the clamp 46 includes a first segment 80 and a second segment 82. The first segment 80 has a plurality of alternating convex segments 84 and concave segments 86 disposed transversely along an axis E-E extending a length of the clamp 46. The pattern of the alternating convex segments 84 and concave segments 86 of the first segment 80 of the clamp 46 is configured to correspond to the similar patterns of convex segments and concave segments forming the blade 42 and the first segment 68 of the grate 44.

Referring again to FIG. 4a, the second segment 82 of the clamp 46 is attached to the first segment 80 and forms a lower surface 88. The second segment 82 further includes apertures 90a, 90b. As will be explained in more detail below, the lower surface 88 and the apertures 90a, 90b are used to secure the blade 42, grate 44 and clamp 46 to the blade holder 40.

With renewed reference to FIG. 4a, the plurality of fasteners 48 are configured to extend through the apertures 90a, 90b of the clamp and engage the apertures 60a, 60b of the blade holder 40. In the illustrated embodiment, the fasteners 48 are threaded bolts and the apertures 60a, 60b are threaded holes. Alternatively, other structures, mechanisms and devices, such as for example can be used to secure the blade 42, grate 44 and clamp 46 to the blade holder 40.

Figure 4B:
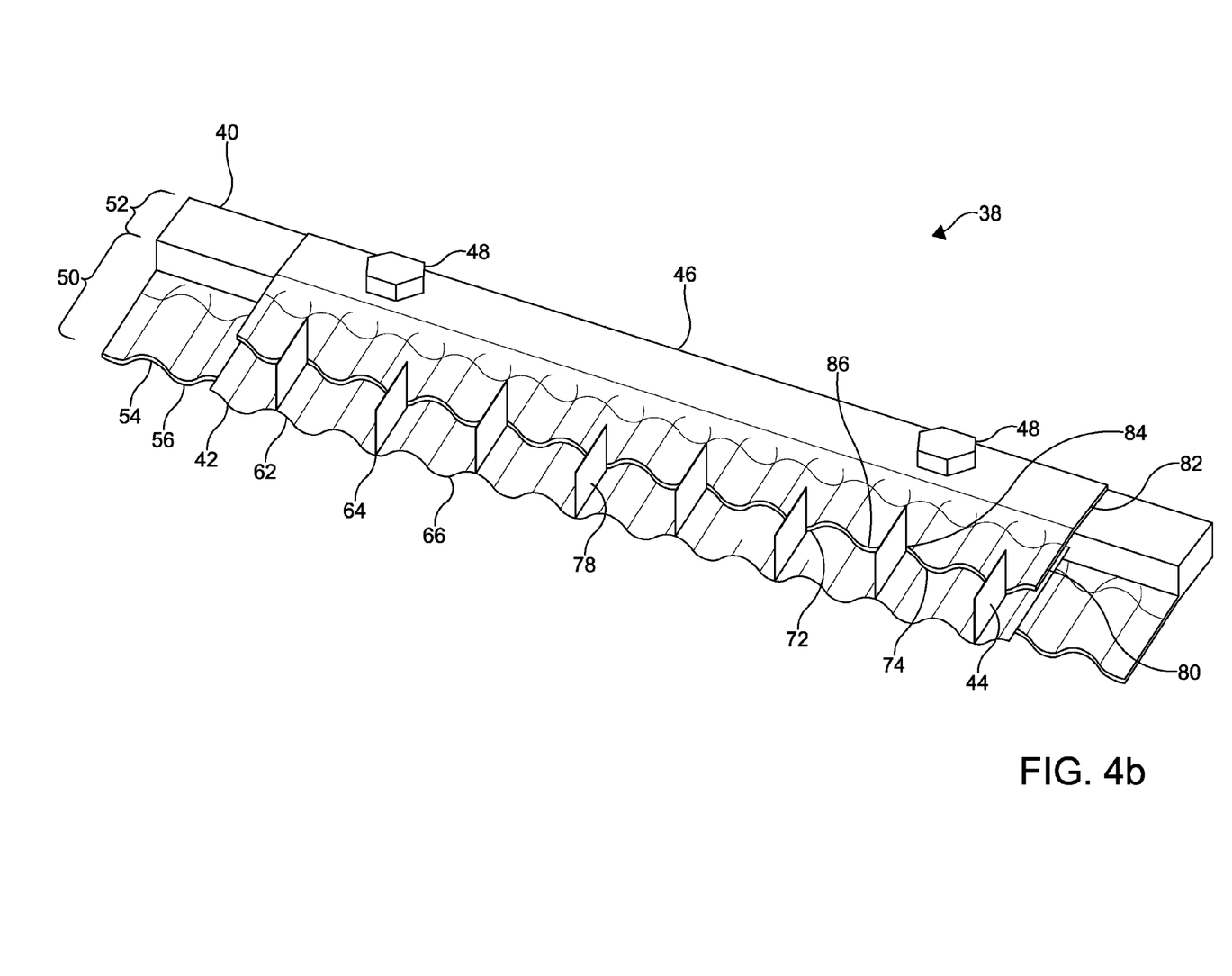
FIG. 4*b* is a perspective view of an assembled blade and grate assembly of FIG. 4*a*.

Referring now to FIG. 4b, a view of the blade and grate assembly 38 is illustrated. The blade holder 40 having the first segment 50 and the second segment 52 is positioned on the bottom of the assembly 38. Next, the blade 42 is nested with the first segment 50 of the blade holder 40 such that the convex and concave segments 62, 64 of the blade 42 align with the convex and concave segments 54, 56 respectively of the blade holder 40. Next, the grate 44 is positioned such that the convex and concave segments 72, 74 of the first segment 68 of the grate 44 are aligned and nested with the convex and concave segments 62, 64 of the blade 42. Next, the first segment 80 of the clamp 46 is nested with the first segment 68 of the grate 44 such that the convex and concave segments 84, 86 of the clamp 46 align with the convex and concave segments 72, 74 respectively of the grate 44. In this position, the lower surface 88 of the clamp 46 seats against the upper surface 58 of the blade holder 40. Finally, the fasteners 48 are configured to provide a compressive force to the assembled clamp 46, grate 44, blade 42 and blade holder 40, such as to secure the assembly 38.

Referring again to FIG. 4b, it can be seen that in an assembled position, the edge 66 of the blade 42 extends beyond the first segment 50 of the blade holder 40. The edge 66 of the blade 42 is arranged in this manner to allow the blade 42 to cut the potatoes (not shown) into thin slices. It can also be seen that in an assembled position, the teeth 76 of the grate 44 are positioned to cut the thin slices of potato into thin strips of product 10 having the desired wavy cross-sectional shape as shown in FIGS. 1 and 2.

Referring again to FIG. 4b, the blade and grate assembly 38 can be used in concordance with any automatic or high speed production line or in concordance with any other slicing machine, device, or apparatus. Additionally, the blade and grate assembly 38 advantageously results in easy removal of the blade 42 and grate 44 in order to efficiently interchange production of marcelled potato chips to the wavy potato stick product, and vice versa.

A further embodiment according to the present disclosure is illustrated in FIGS. 5-9. Relative to FIGS. 1-4b, like or related structure in FIGS. 5-9 is identified with the same reference number in a 100-series, for purpose of clarity.

Figure 5:
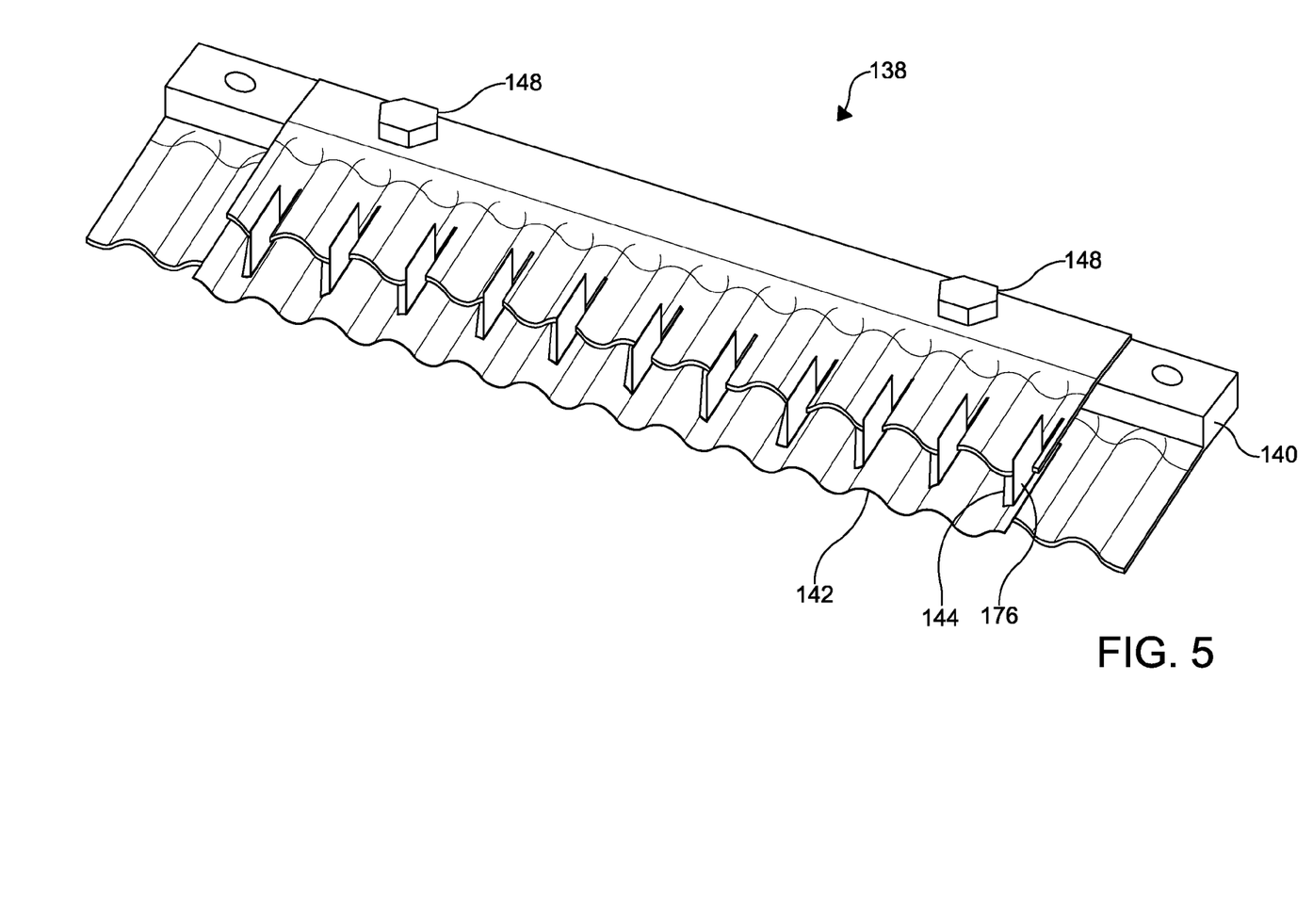
FIG. 5 is a perspective view of a blade and grate assembly for use with the potato slicing machine of FIG. 3, according to another embodiment of the present disclosure.
Figure 6:
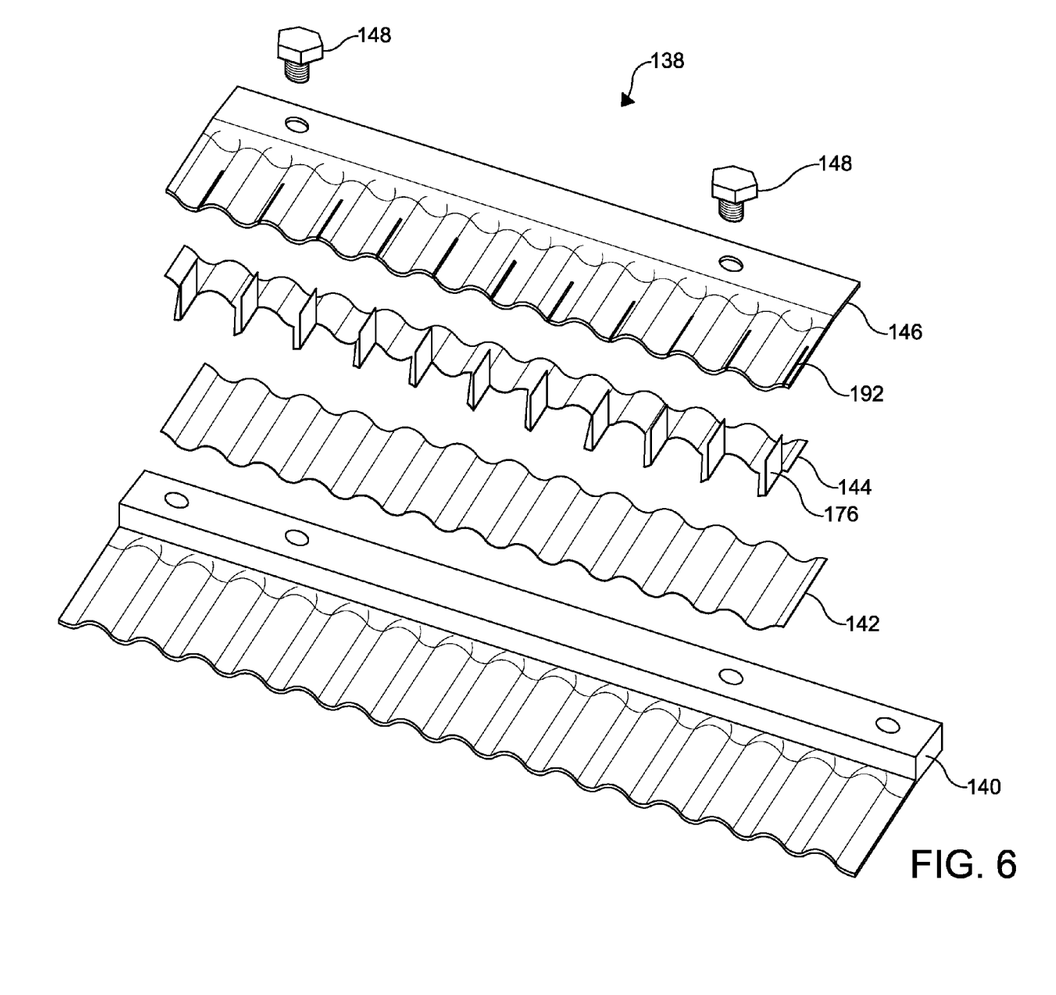
FIG. 6 is an exploded perspective view of the blade and grate assembly shown in FIG. 5.

A blade and grate assembly 138 according to the further embodiment is shown fully assembled in FIG. 5, and exploded in FIG. 6. The blade and grate assembly 138 includes a blade holder 140, a blade 142, a grate 144, a clamp 146 and a plurality of fasteners 148. The features of the blade holder 140, the blade 142, and the fasteners 148 according to this further embodiment are substantially the same as described hereinabove with respect to the blade holder 40, the blade 42, and the fasteners 48 in FIGS. 1-4b.

Figure 8:
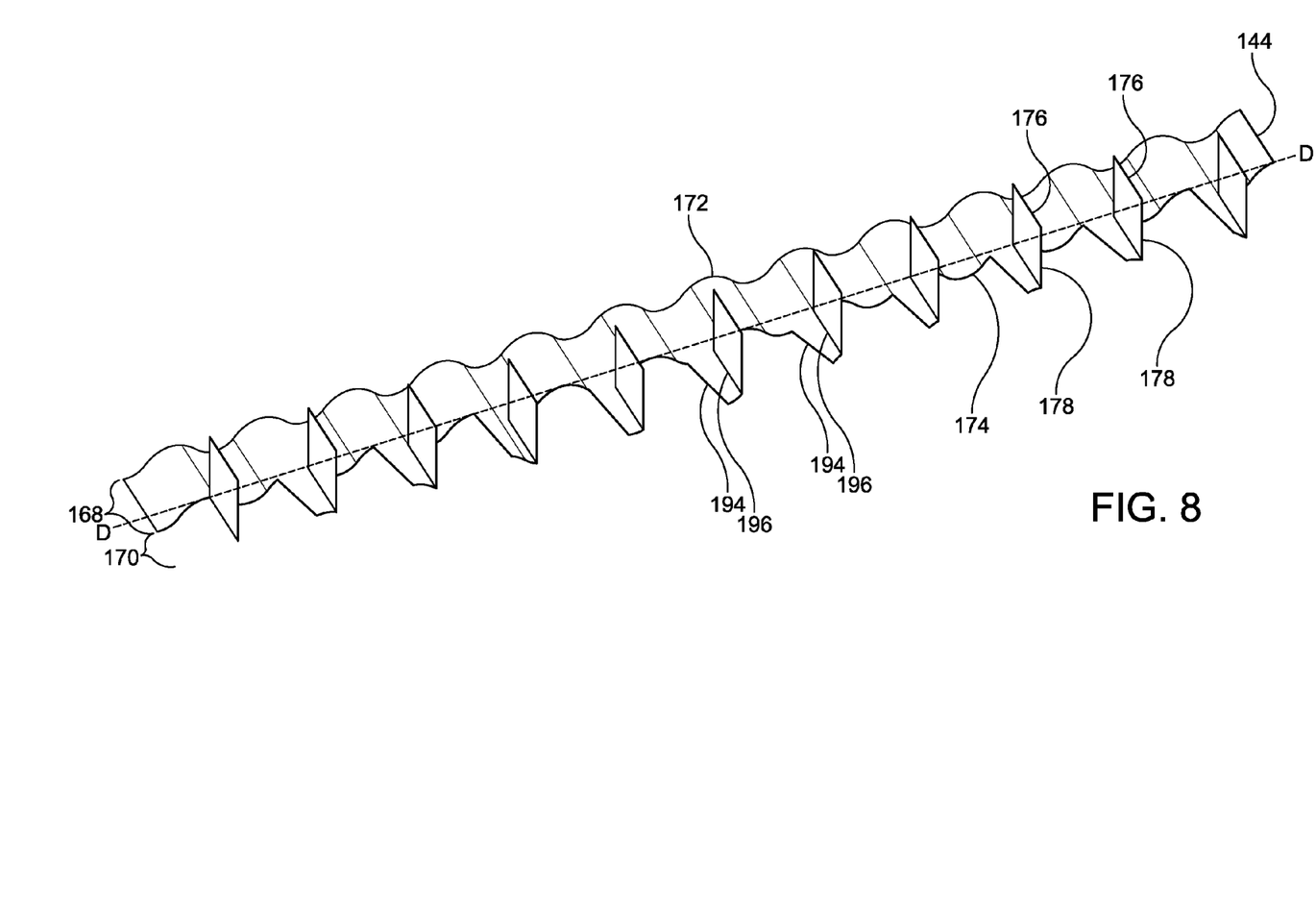
FIG. 8 is a perspective view of a grate having a plurality of teeth, for use with the blade and grate assembly shown in FIGS. 5 and 6.

Referring to FIGS. 6 and 8, the grate 144 includes a first segment 168 and a second segment 170. The first segment 168 includes a plurality of alternating convex segments 172 and concave segments 174 disposed transversely along a transverse axis D-D of the grate 144. In the illustrated embodiment, the convex segments 172 and concave segments 174 of the grate 144 have similar heights and widths of the convex segments and concave segments of the blade 142, thereby allowing the first segment 168 of the grate 144 to align and nest with the blade 142. In other embodiments, the convex segments 172 and concave segments 174 of the grate 144 can have other shapes, dimensions and characteristics sufficient to allow the first segment 168 of the grate 144 to nest with the blade 142.

Furthermore, the second segment 170 of the grate 44 includes a plurality of spaced apart teeth 176 extending from the convex segments 172 and the concave segments 174. In the illustrated embodiment, the teeth 76 are aligned in planes that are substantially perpendicular to the transverse axis D-D. However, in other embodiments, the teeth 76 can have other desired alignments relative to the transverse axis D-D.

The teeth 176 have an edge 178 configured to slice potatoes. In the illustrated embodiment, the edge 178 is configured as a double edged razor. Alternatively, the edge 178 can have other configurations, such as for example, a single edge, sufficient to slice potatoes.

Referring again to embodiment illustrated in FIGS. 6 and 8, the edge 178 is aligned to be substantially perpendicular to the transverse axis D-D. However, in other embodiments, the edge 178 can be aligned in other orientations relative to the transverse axis D-D.

As discussed above, the teeth 176 are spaced apart along the length of the grate 144 a substantially equal distance from each other. In the illustrated embodiment, the distance is substantially the same as the width of the product 10 as shown in FIG. 1. It is contemplated that the distance between teeth 176 may vary as desired.

Referring again to the embodiment shown in FIGS. 6 and 8, the teeth 176 have a substantially rectangular shape. Alternatively, the teeth 176 can have any desired shape, including the non-limiting shape of a triangle, sufficient that an edge 178 of the teeth is configured for forming the product 10.

Referring again to FIGS. 6 and 8, the teeth 176 are disposed along the length of the grate 144 such that the resulting product 10 comprises at least one peak 12 and at least one trough 14. Positioning of the teeth 176 in these locations allows the grate 144 to slice the potatoes such as to form the shape of the product 10 shown in FIGS. 1 and 2. It should be understood that the teeth 176 can be disposed in a substantially identical manner along the length of the grate 144, such that each of the teeth 176 can be disposed at the vertex of each convex segment 172 or in another manner. Additionally, it should be understood that the teeth 176 can also be spaced apart at varying distances.

In the embodiment illustrated in FIG. 8, the grate 144 and the teeth 176 are formed as a unitary structure. In particular, the grate 144 according to the further embodiment may also have a plurality of curved projections 194 that extend outwardly from the first segment 168. The curved projections has a curvature corresponding to that of the convex segment 172 and/or the concave segment 174 from which the projection 194 extends. Moreover, each of the teeth 176 may be formed by bending an associated one of the projections upward at an angle 196, such that the teeth 176 are oriented substantially perpendicular to the axis D-D. It should be appreciated that the teeth 176 may not be oriented substantially perpendicular relative to the remainder of the projections 194 from which they extend, as the projections 194 instead have the curvature of the associated convex and concave segments 172, 174. It has also been found that the forming of the teeth 176 in this manner results in a particularly robust arrangement of the teeth 176 on the grate 144. Other suitable means for forming the teeth 176 may also be employed, as desired.

Referring again to the embodiment illustrated in FIGS. 6 and 8, the grate 144 is formed from a metallic material, such as for example, carbon steel. However, in other embodiments, the grate 144 can be formed from other materials, such as for example, polymeric materials, sufficient to slice potatoes. Further, the grate 144 can have any desired surface coating, such as for example, a low-friction coating or any desired surface texture, such as the non-limiting example of a micro-grooved surface texture.

Figure 7:
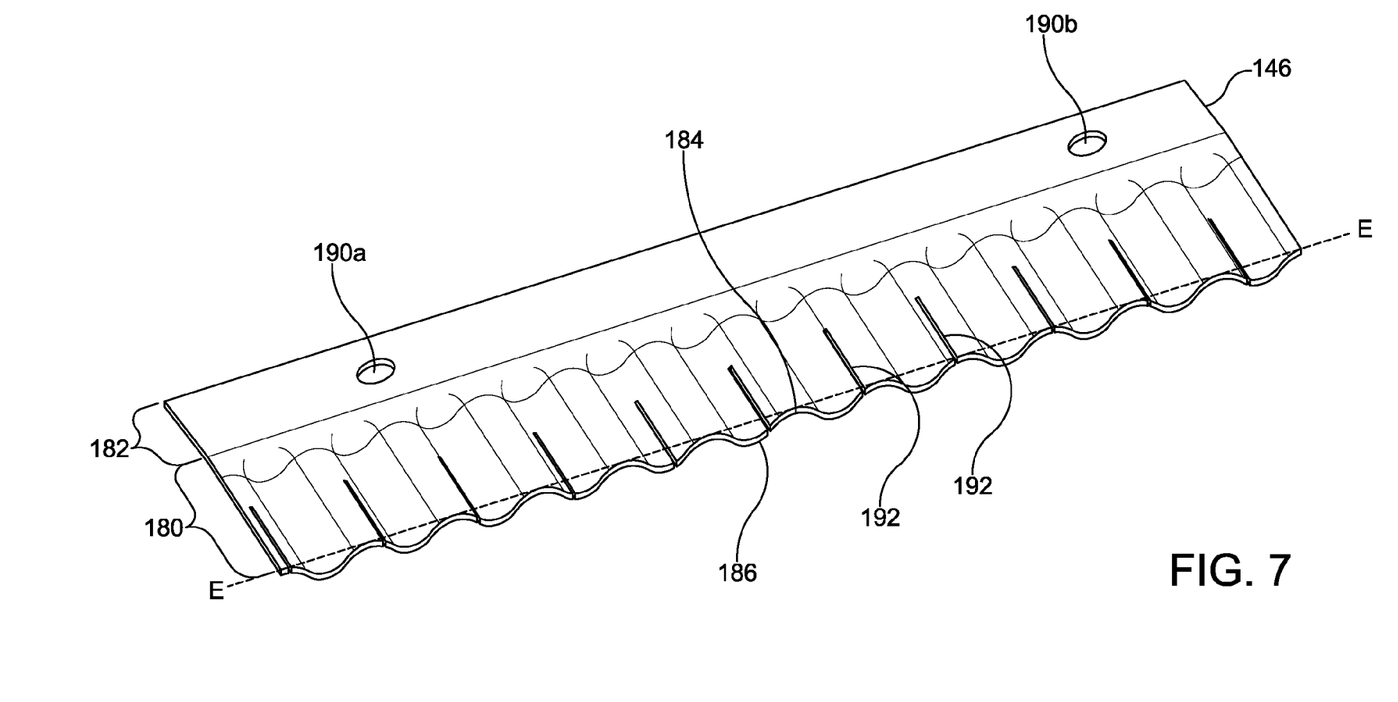
FIG. 7 is a perspective view of a clamp plate for use with the blade and grate assembly shown in FIGS. 5 and 6.

Referring to FIGS. 7 and 8, the clamp 146 includes a first segment 180 and a second segment 182. The first segment 180 has a plurality of alternating convex segments 184 and concave segments 186 disposed transversely along an axis E-E extending a length of the clamp 146. The pattern of the alternating convex segments 184 and concave segments 186 of the first segment 180 of the clamp 146 is configured to correspond to the similar patterns of convex segments and concave segments forming the blade 142 and forming the first segment 168 of the grate 44.

Referring again to FIGS. 5 and 6, the second segment 182 of the clamp 146 is attached to the first segment 180 and forms a lower surface. The first segment 180 has a plurality of slots 192 formed therein. The slots 192 are oriented substantially perpendicular to the longitudinal axis E-E of the clamp 146. As described further herein below, the slots 192 have a width sufficient receive the teeth 176 of the grate 144 when assembled together in the blade and grate assembly 138. The second segment 182 further includes apertures 190a, 190b. As will be explained in more detail below, the lower surface and the apertures 190a, 190b are used to secure the blade 142, the grate 144 and the clamp 146 to the blade holder 140.

The plurality of fasteners 148 are configured to extend through the apertures 190a, 190b of the clamp and engage the apertures of the blade holder 140. In the illustrated embodiment, the fasteners 148 are threaded bolts and the apertures of the blade holder 140 are threaded holes. Alternatively, other structures, mechanisms and devices, such as for example can be used to secure the blade 142, the grate 144, and the clamp 146 to the blade holder 140.

Figure 9:
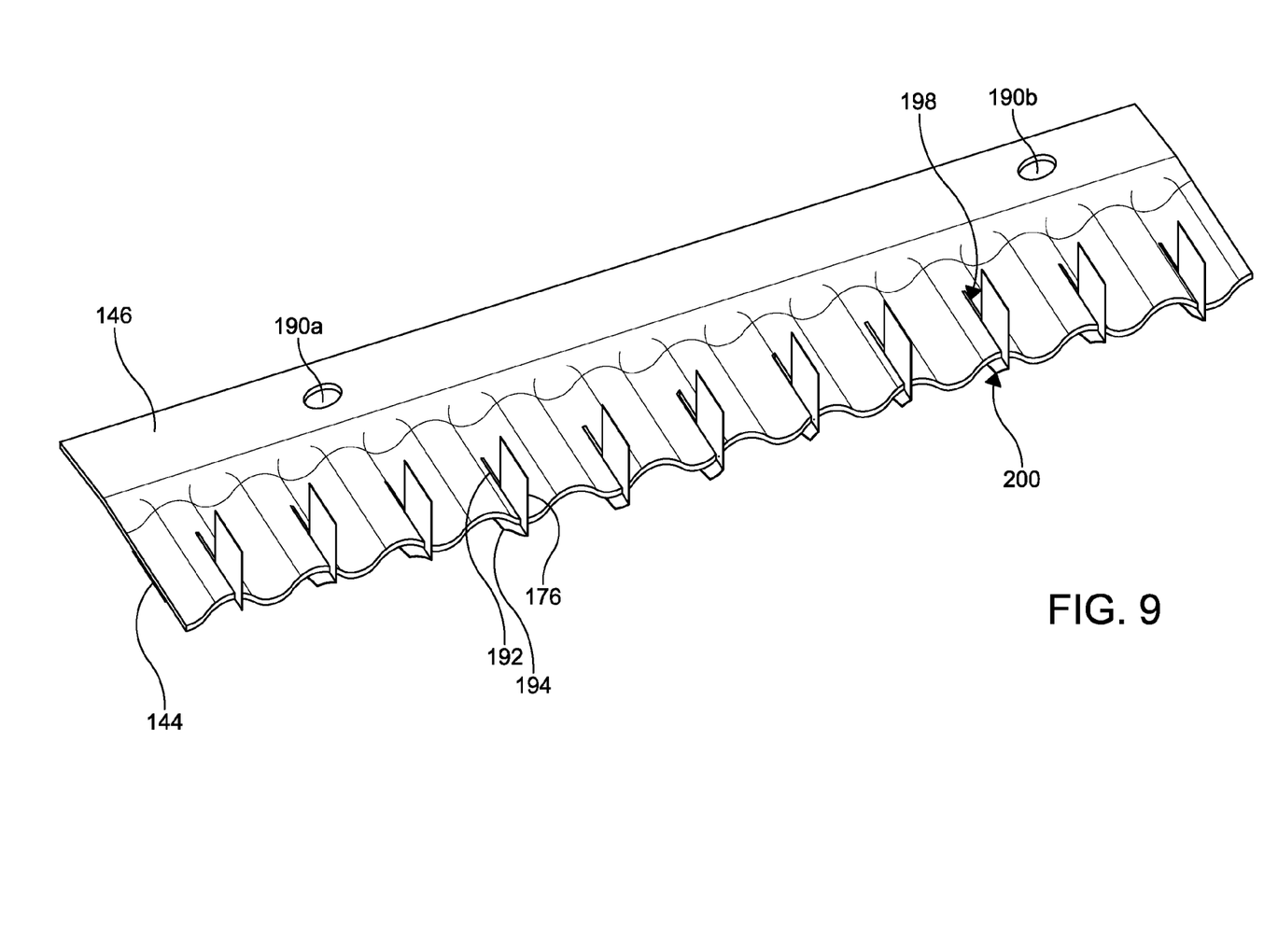
FIG. 9 is a perspective view of the clamp plate of FIG. 7 cooperating with the grate of FIG. 8, the teeth of the grate disposed through slots formed in the clamp plate.

Referring now to FIGS. 5 and 9, full assembled and partially assembled views of the blade and grate assembly 138 are respectively illustrated. The blade holder 140 is positioned on the bottom of the assembly 138. Next, the blade 142 is nested with the blade holder 140 such that the convex and concave segments of the blade 142 align with the convex and concave segments respectively of the blade holder 140. Next, the grate 144 is positioned such that the convex and concave segments 172, 174 of the first segment 168 of the grate 144 are aligned and nested with the convex and concave segments of the blade 142. Next, the first segment 180 of the clamp 146 is nested with the first segment 168 of the grate 144 such that the convex and concave segments 184, 186 of the clamp 146 align with the convex and concave segments 172, 174 respectively of the grate 144. In this position, the lower surface of the clamp 146 seats against the upper surface of the blade holder 140.

Furthermore, in this position the teeth 176 of the grate 144 are disposed through the slots 192 of the clamp 146. The slots 192 advantageously function to support and hold the teeth 176 in a substantially upright position during the cutting operation. This makes the teeth 176 more robust and minimizes an opportunity for breakage. There may also be a gap 198 between a rear of the teeth 176 and the innermost ends of the slots 192, in order to accommodate teeth 176 of varying widths or sizes. A portion 200 of the teeth 176 and their associated projections 194 may also extend outwardly from the front edge of the clamp 146, and may further facilitate a holding of the blade 142 in place between the clamp 146 and the holder 140.

Finally, the fasteners 148 are configured to provide a compressive force to the assembled clamp 146, the grate 144, the blade 142 and the blade holder 140, such as to secure the assembly 138.

Referring again to FIG. 5, it can be seen that in an assembled position, the edge of the blade 142 extends beyond the first segment of the blade holder 140. The edge of the blade 142 is arranged in this manner to allow the blade 142 to cut the potatoes (not shown) into thin slices. It can also be seen that in an assembled position, the teeth 176 of the grate 144 are positioned to cut the thin slices of potato into thin strips of product 10 having the desired wavy cross-sectional shape as shown in FIGS. 1 and 2.

The blade and grate assembly 138 can be used in concordance with any automatic or high speed production line or in concordance with any other slicing machine, device, or apparatus. Additionally, the blade and grate assembly 138 advantageously results in easy removal of the blade 142 and grate 144 in order to efficiently interchange production of marcelled potato chips to the wavy potato stick product, and vice versa.

In operation, the method of manufacturing the product 10 includes the following steps: first a blade with a cutting edge having a marcelled shape is nested with a blade holder. The blade is configured to cut potatoes into thin slices. Next, a grate having a plurality of offset teeth is nested with the blade. The teeth are configured to cut the potato slices into potato strips. Next, a clamp and fasteners are configured to secure the blade holder, blade and grate into the blade and grate assembly. In a next step, the blade and grate assembly are fitted into a suitable slicing machine, device, or apparatus. Finally, the slicing machine is operated to feed a potato through the blade and grate assembly thereby forming potato strips having a novel wavy shape.

It should be appreciated that other food products can be employed to create marcelled slices of the respective food product, such as for example, other vegetables or fruit. As examples, carrots can be used to create marcelled carrot sticks or an eggplant can be used to create marcelled eggplant sticks. Processed food stuffs may also be sliced into the wavy stick product using the system and method of the present disclosure.

Referring again to FIGS. 1 and 2, the product 10 advantageously has an appealing shape and overall appearance, and is also surprisingly dimensionally stable for purposes of packaging and transporting to the consumer.

Advantageously, the potato stick product 10 having the shape a described hereinabove is believed to be more robust than conventional potato stick products, which facilitates storage and transport of the product 10. The product 10 is also believed to exhibit less breakage when receiving dips, and particularly thicker dips, in comparison to flat potato stick products known in the art.

The principle and mode of operation of the apparatus and method for forming potato stock products having a wavy shape have been described in certain embodiments. However, it should be noted that the apparatus and method for forming potato stock products may be practiced otherwise than as specifically illustrated and described without departing from its scope.

What is claimed is:

1. A blade and grate assembly for use in forming potato stick products having a wavy cross-sectional shape, the blade and grate assembly comprising:
   a blade holder having a plurality of alternating convex segments and concave segments;
   a blade nested with the blade holder, the blade having a plurality of alternating convex segments and concave segments with a cutting edge configured to extend beyond the convex segments and concave segments of the blade holder, the cutting edge of the blade further configured to form the wavy cross-sectional shape of the potato sticks;
   a grate nested with the blade, the grate having a rearward portion and a forward portion, the rearward portion having a plurality of alternating convex segments and concave segments configured to align with the plurality of alternating convex segments and concave segments of the blade, the forward portion of the grate having a plurality of spaced apart teeth, a distance between the spaced apart teeth defining a width of the potato stick products; and
   a clamp configured to secure the blade and the grate to the blade holder, the clamp having a main body with a first segment having a plurality of alternating convex segments and concave segments extending in a repeating pattern along a longitudinal axis of the main body, wherein the first segment includes a plurality of spaced apart slots formed therein for receiving the plurality of spaced apart teeth of the grate, and the main body further having a second segment for coupling with the blade holder.

2. The blade and grate assembly of claim 1, wherein the teeth extend from the grate in a direction substantially perpendicular to an axis extending a length of the grate, and the teeth extend upwardly through the slots of the clamp.

3. The blade and grate assembly of claim 2, wherein each of the teeth has a cutting edge.

4. The blade and grate assembly of claim 1, wherein the teeth and the slots are arranged such that the potato stick products have at least one peak and at least one trough.

5. The blade and grate assembly of claim 4, wherein the cutting edges of the teeth extend in a direction substantially perpendicular to an axis extending a length of the blade.

6. The blade and grate assembly of claim 1, wherein the potato stick products have a width in a range of from about 0.04 inches to about 0.10 inches.

7. The blade and grate assembly of claim 1, wherein each of the teeth is bent upwardly at an angle from a projection that extends outwardly from the first segment of the grate.

8. The blade and grate assembly of claim 7, wherein each of the projections has a curvature that is substantially the same as that of an adjacent one of the convex segments and the concave segments of the first segment of the grate from which the projection extends outwardly.

9. A method of forming potato sticks having a wavy cross-sectional shape, comprising the steps of:
   providing a blade and grate assembly including a blade holder having a plurality of alternating convex segments and concave segments, a blade nested with the blade holder, the blade having a plurality of alternating convex segments and concave segments with a cutting edge configured to extend beyond the convex segments and concave segments of the blade holder, the cutting edge of the blade further configured to form the wavy cross-sectional shape of the potato sticks, a grate nested with the blade, the grate having a rearward portion and a forward portion, the rearward portion having a plurality of alternating convex segments and concave segments configured to align with the plurality of alternating convex segments and concave segments of the blade, the forward portion of the grate having a plurality of spaced apart teeth, a distance between the spaced apart teeth defining a width of the potato stick products, and a clamp configured to secure the blade and the grate to the blade holder, the clamp having a main body with a first segment having a plurality of alternating convex segments and concave segments extending in a repeating pattern along a longitudinal axis of the main body, wherein the second segment includes a plurality of spaced apart slots formed therein for receiving the plurality of spaced apart teeth of the grate, and the main body further having a second segment for coupling with the blade holder; and
   urging one or more potatoes through the nested blade, grate and teeth such that the wavy potato sticks are formed.

10. The method of claim 9, wherein the blade is nested with the blade holder such that there is no appreciable space between the blade and the blade holder.

11. The method of claim 9, wherein the teeth extend from the grate in a direction substantially perpendicular to an axis extending a length of the grate, and the teeth extend upwardly through the slots of the clamp.

12. The method of claim 9, wherein the cutting edges of the teeth extend in a direction substantially perpendicular to an axis extending a length of the blade.

13. The method of claim 9, wherein the potato stick has a least one peak and at least one trough.

14. The method of claim 9, furthering including the step of installing the blade and the grate in a cutting head assembly.

* * * * *